US012712862B2

(12) United States Patent
Hans et al.

(10) Patent No.: US 12,712,862 B2
(45) Date of Patent: Aug. 18, 2026

(54) MULTIPLE ENCRYPTION KEY SUPPORT FOR ENCRYPTED ADVERTISEMENT DATA

(71) Applicant: QUALCOMM Incorporated, San Diego, CA (US)

(72) Inventors: Jagdeep Kumar Hans, Bangalore (IN); Chirag Manojkumar Kharvar, Bangalore (IN); Jaikishore Gali, Bangalore (IN); Vasanthavalli Chandran, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 18/601,821

(22) Filed: Mar. 11, 2024

(65) Prior Publication Data

US 2025/0286870 A1 Sep. 11, 2025

(51) Int. Cl.
*H04L 9/40* (2022.01)

(52) U.S. Cl.
CPC ................................ *H04L 63/0478* (2013.01)

(58) Field of Classification Search
CPC ............... H04L 63/0478; H04L 9/0618; H04L 2209/80; H04L 9/12; H04L 2463/062; H04L 63/0428; H04L 2209/601; H04W 12/033; H04W 12/041
See application file for complete search history.

(56) References Cited

U.S. PATENT DOCUMENTS

| | | | | |
|---|---|---|---|---|
| 4,386,266 | A * | 5/1983 | Chesarek | G07F 7/1016 705/72 |
| 4,802,217 | A * | 1/1989 | Michener | H04L 9/3271 380/46 |
| 2015/0110273 | A1* | 4/2015 | Ponceleon | H04L 9/14 380/277 |
| 2017/0134168 | A1* | 5/2017 | Barnett | H04L 9/0861 |
| 2018/0035294 | A1 | 2/2018 | Reunamaki et al. | |
| 2021/0167955 | A1* | 6/2021 | Rameez | H04L 9/0822 |
| 2021/0250759 | A1 | 8/2021 | Ziv et al. | |
| 2022/0004599 | A1* | 1/2022 | Pettitt | H04L 9/30 |
| 2023/0004667 | A1* | 1/2023 | Iyer | H04L 9/0891 |

OTHER PUBLICATIONS

Chunbo et al., "Broadcast group-oriented encryption secure against chosen ciphertext attack", Dec. 2007, Journal of Systems Engineering and Electronics, vol. 18, No. 4, pp. 811-817 (Year: 2007).*
International Search Report and Written Opinion—PCT/US2025/011741—ISA/EPO—May 8, 2025.

* cited by examiner

*Primary Examiner* — Kenneth W Chang
(74) *Attorney, Agent, or Firm* — Polsinelli

(57) ABSTRACT

Techniques and systems are provided for wireless communications. For instances, a process can include: encrypting first data for broadcast based on a first cryptographic key; attaching a first key identifier for the first cryptographic key to the encrypted first data to generate a first payload value; encrypting the first payload value based on a second cryptographic key and a randomizer value; attaching the randomizer value to the encrypted first payload value to generate advertisement data; and broadcasting the advertisement data.

24 Claims, 9 Drawing Sheets

| Attribute Handle | Attribute Type | Attribute Value | Attribute Permission |
|---|---|---|---|
| 0xNNNN | 0x2800 – UUID for <<Primary Service>> OR 0x2801 for <<Secondary Service>> | UUID for EAD Key Material Service | Read Only, No Authentication, No Authorization |

FIG. 5A

| Attribute Handle | Attribute Type | Attribute Value | Attribute Permission |
|---|---|---|---|
| 0xMMMM | Vendor Specific UUID for "EAD vendor key" | Vendor Key Material | Readable when authenticated and authorized<br><br>Indicatable when authenticated and authorized<br><br>Not writable |

FIG. 5B

| Field | Size (octets) | Description |
|---|---|---|
| Key Id 502<br><br>Session Key 504 | 1<br><br>16 | Key Identifier for the shared session key<br><br>The shared session key |
| IV 506 | 8 | The initialization vector |

FIG. 5C

MULTIPLE ENCRYPTION KEY SUPPORT FOR ENCRYPTED ADVERTISEMENT DATA

FIELD

This application is related to securing communications. For example, aspects of the application relate to systems and techniques for multiple encryption key support for encrypted advertisement data (EAD).

BACKGROUND

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include wireless communication devices that use low-energy communication technology for positioning, proximity marketing, or other purposes. As an example, low-energy wireless communication devices may be used as nodes (e.g., relay nodes) of a wireless mesh network that communicates and/or relays information to a managing platform or hub associated with the wireless mesh network. Techniques for securing communications between nodes may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for multiple encryption key support for EAD. For example, an apparatus for wireless communications by a network device is provided. The apparatus includes at least one memory; and at least one processor coupled to the at least one memory. The at least one processor is configured to: encrypt first data for broadcast based on a first cryptographic key; attach a first key identifier for the first cryptographic key to the encrypted first data to generate a first payload value; encrypt the first payload value based on a second cryptographic key and a randomizer value; attach the randomizer value to the encrypted first payload value to generate advertisement data; and broadcast the advertisement data.

As another example, a method for wireless communications by a network device, comprising: encrypting first data for broadcast based on a first cryptographic key; attaching a first key identifier for the first cryptographic key to the encrypted first data to generate a first payload value; encrypting the first payload value based on a second cryptographic key and a randomizer value; attaching the randomizer value to the encrypted first payload value to generate advertisement data; and broadcasting the advertisement data.

In another example, a non-transitory computer-readable medium having stored thereon instructions is provided. The instruction, when executed by at least one processor, cause the at least one processor to encrypt first data for broadcast based on a first cryptographic key; attach a first key identifier for the first cryptographic key to the encrypted first data to generate a first payload value; encrypt the first payload value based on a second cryptographic key and a randomizer value; attach the randomizer value to the encrypted first payload value to generate advertisement data; and broadcast the advertisement data.

As another example, an apparatus for wireless communications by a network device is provided. The apparatus includes means for encrypting first data for broadcast based on a first cryptographic key; means for attaching a first key identifier for the first cryptographic key to the encrypted first data to generate a first payload value; means for encrypting the first payload value based on a second cryptographic key and a randomizer value; means for attaching the randomizer value to the encrypted first payload value to generate advertisement data; and means for broadcasting the advertisement data.

In another example, an apparatus for wireless communications is provided. The apparatus includes: at least one memory; and at least one processor coupled to the at least one memory, the at least one processor being configured to: receive broadcast advertisement data; decrypt a first payload value of the broadcast advertisement data using a first cryptographic key and a randomizer value of the broadcast advertisement data; retrieve first key material based on a first key identifier obtained from the decrypted first payload value; obtain a second cryptographic key based on the retrieved first key material; and decrypt a second payload value using the second cryptographic key, the second payload value obtained from the decrypted first payload value.

As another example, a method for wireless communications by a wireless device is provided. The method includes: receiving broadcast advertisement data; decrypting a first payload value of the broadcast advertisement data using a first cryptographic key and a randomizer value of the broadcast advertisement data; retrieving first key material based on a first key identifier obtained from the decrypted first payload value; obtaining a second cryptographic key based on the retrieved first key material; and decrypting a second payload value using the second cryptographic key, the second payload value obtained from the decrypted first payload value.

In another example, a non-transitory computer-readable medium having stored thereon instructions is provided. The instructions, when executed by at least one processor, cause the at least one processor to: receive broadcast advertisement data; decrypt a first payload value of the broadcast advertisement data using a first cryptographic key and a randomizer value of the broadcast advertisement data; retrieve first key material based on a first key identifier obtained from the decrypted first payload value; obtain a second cryptographic key based on the retrieved first key material; and decrypt a second payload value using the second cryptographic key, the second payload value obtained from the decrypted first payload value.

As another example, an apparatus for wireless communications is provided. The apparatus includes means for receiving broadcast advertisement data; means for decrypting a first payload value of the broadcast advertisement data using a first cryptographic key and a randomizer value of the broadcast advertisement data; means for retrieving first key material based on a first key identifier obtained from the decrypted first payload value; means for obtaining a second cryptographic key based on the retrieved first key material; and means for decrypting a second payload value using the second cryptographic key, the second payload value obtained from the decrypted first payload value.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the one or more apparatuses can include at least one camera for capturing one or more images or video frames. For example, the one or more apparatuses can include a camera (e.g., an RGB camera) or multiple cameras for capturing one or more images and/or one or more videos including video frames. In some aspects, the one or more apparatuses can include a display for displaying one or more images, videos, notifications, or other displayable data. In some aspects, the one or more apparatuses can include at least one transmitter configured to transmit data or information over a transmission medium to at least one device. In some aspects, at least one processor of the one or more apparatuses can include a central processing unit (CPU), a digital signal processor (DSP), a graphics processing unit (GPU), a neural processing unit (NPU), a neural signal process (NSP), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 5A illustrates a vendor specific Primary Service "EAD (encrypting advertising data) Key Material Service" with a vendor specific universally unique identifier (UUID) that may be defined for indicating support for multiple key materials, in accordance with aspects of the present disclosure.

FIG. 5B illustrates vendor specific characteristic for sharing multiple key materials, in accordance with aspects of the present disclosure.

FIG. 5C illustrates key materials for the multiple keys, in accordance with aspects of the present disclosure.

DETAILED DESCRIPTION

Figure 1:
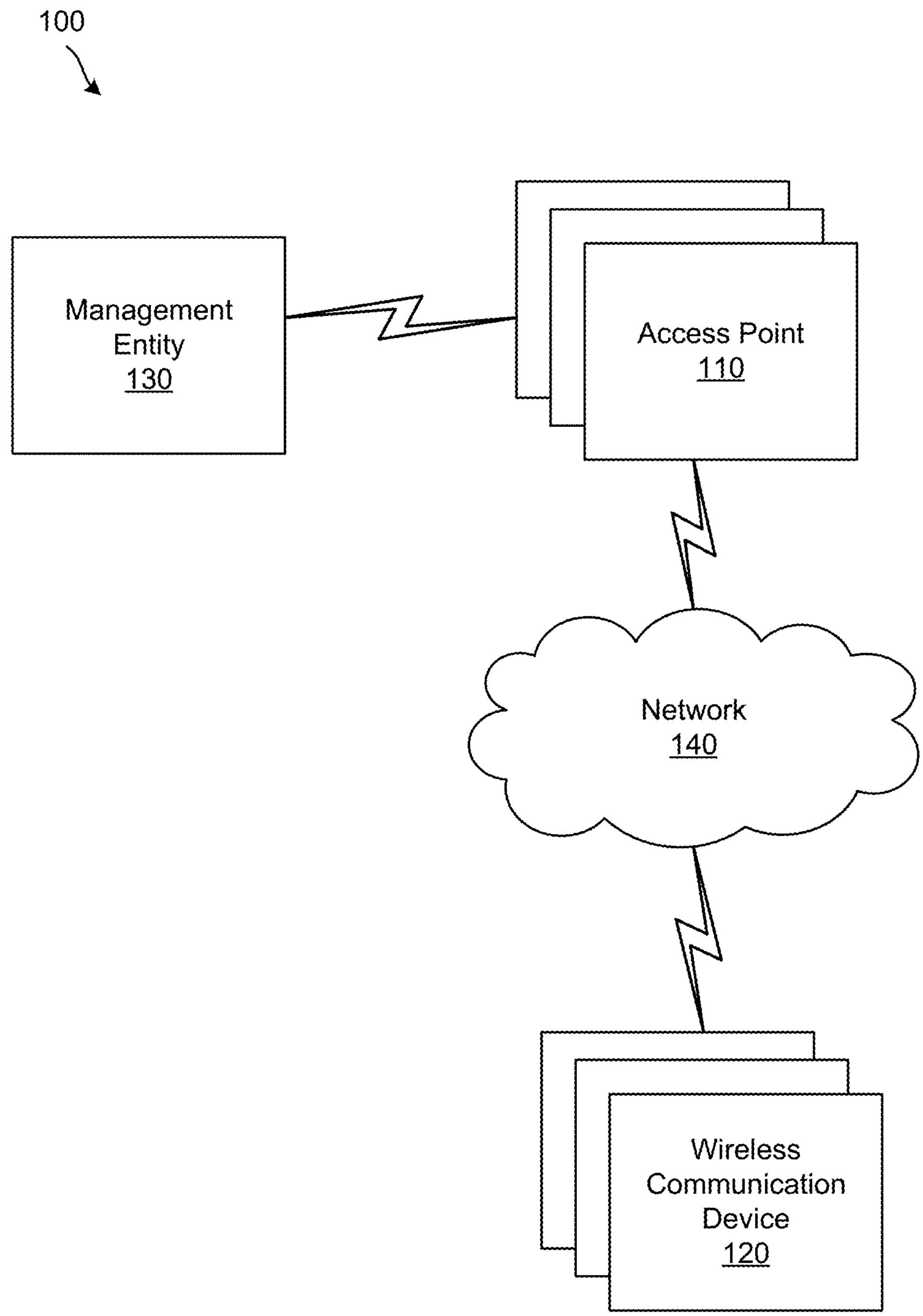
FIG. 1 is a diagram of an example environment in which systems and/or methods described herein may be implemented.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A system may include one or more wireless communication devices that are controlled by a network entity. For example, a system may include one or more peripheral devices (e.g., electronic shelf label (ESL)) that are controlled by a network entity, such as a management entity (ME), via at least one additional network entity, such as an access point (AP). As used herein, the terms "network entity" and "network device" may be interchangeable. For example, an AP can be referred to as an example of a "network entity" and/or can be referred to as an example of a "network device." A "network entity" can include an AP, an ME, and/or a combination of the two. A "network device" can include an AP, an ME, and/or a combination of the two. In some examples, a single device can implement the functionality of an ME and an AP (e.g., an ME and an AP can be combined in a single device).

In one or more examples, to facilitate control by the ME, each wireless communication device (e.g., peripheral device, such as an ESL) may have a wireless connection (e.g., a BLUETOOTH® Low Energy (BLE) connection or other connection) to AP that is communicatively connected to the ME (e.g., via the Internet, such as wirelessly, via an Ethernet connection, etc.). In some cases, commands from the ME may be wirelessly transmitted to the wireless communication devices by the AP. Responses or information from the wireless communication devices may also be received by the AP and provided by the AP to the ME.

Each AP may have an associated channel map. A channel map is a listing of frequency channels to be utilized or, conversely, not to be utilized (e.g., in the context of modification of frequency hopping sequences) by an AP for communication, such as with the wireless communication devices (e.g., ESLs or other peripheral devices). While examples are described herein using ESLs as illustrative examples of wireless communication devices or peripherals, a management entity as an example of a network entity, and access points as examples of network entities, the systems and techniques described herein are applicable to any type of system or network.

In some cases, a broadcast system, such as an ESL system, may be encrypted such that the ESL system may broadcast encrypted data that may be received and decoded by a wireless communication device (e.g., a peripheral device such as an ESL) to avoid interception of the encrypted data. In some cases, wireless communication devices may be associated with the broadcast system. For example, a BLE wireless communication device may transmit encrypted advertisement messages (e.g., beacons) to peripheral systems. In some cases, the encrypted advertisements may be encrypted using a technique known as encrypted advertisement data (EAD). EAD allows the data inside the advertisements to be encrypted and decrypted by authenticated and authorized users. Key exchange in EAD may occur as a part of a registration (e.g., provisioning, synchronization, pairing, etc.) process that happens over a secured connection which is established between broadcaster and the peer receiving devices, or key exchange may be performed out-of-band (OOB) (e.g., via a separate network connection, during a registration process with a server, radio frequency identification (RFID) tag, etc.).

In some cases, existing techniques may not provide a way to encrypt different sets of data using multiple different cryptographic keys so that multiple instances of encrypted data may be used. Additionally, existing techniques may not provide a way to identify which cryptographic key, of the multiple different cryptographic keys, should be used for decrypting a received advertisement. Thus, it may be useful to extend EAD to allow multiple devices to use multiple cryptographic keys for advertisements of a wireless system.

Systems and techniques are described for multiple encryption key support for encrypted advertisement data. In some cases, key material, such as information that may be used to obtain a cryptographic key, may be associated with a key identifier and added to advertisement data (e.g., an advertisement message, such as a beacon). For example, data to be broadcast may be encrypted using a first cryptographic key. The first cryptographic key may be associated with a key identifier and the key identifier along with encrypted data may be included in a payload field. This payload field may be encrypted again using a second cryptographic key based on a randomizer value to generate advertisement data. The randomizer value may be attached to the payload field encrypted using a second cryptographic key to form advertisement data that may be broadcast, for example in an advertisement broadcast. In some cases, second data may also be encrypted using a second key identifier and included in the payload field, which is then encrypted using the second cryptographic key. In this manner, different data sets may be encrypted using different keys for transmission in the same advertisement broadcast.

In some cases, a wireless communication device that has been pre-provisioned during a registration (e.g., provisioning, synchronization, pairing, etc.) process may have stored key materials and associated key identifiers. The wireless communication device may receive the advertisement broadcast including the advertisement data. The wireless communication device may generate a first cryptographic key based on the randomizer value and decrypt the payload field using the first cryptographic key. The wireless communication device may then obtain the key identifier from the decrypted payload field and retrieve key material using the key identifier. The wireless communication device may obtain a second cryptographic key using the retrieved key material and then use the second cryptographic key to decrypt encrypted data from the payload field.

Various aspects of the application will be described with respect to the figures.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable of receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons, BLE advertisements), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be a Bluetooth network configured to broadcast messages, for example via BLE beacons and/or EAD.

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or other device(s). The access point (s) 110 may be communicatively connected to the management entity 130 via a network (not shown), such as the Internet.

A system may include one or more wireless communication devices that are controlled by a network entity, such as the management entity 130. For example, a system including multiple peripheral devices (e.g., an electronic shelf label (ESL) system) may include one or more wireless communication devices 120 (e.g., peripheral devices) that communicate with a network entity, such as a management entity 130, via at least one additional network entity, such as the access point 110. As used herein, the terms "network entity" and "network device" may be interchangeable. For example, an access point 110 can be referred to as an example of a "network entity" and/or can be referred to as an example of a "network device." A "network entity" can include an access point 110, a management entity 130, and/or a combination of the two. A "network device" can include an access point 110, a management entity 130, and/or a combination of the two. In some examples, a single device can implement the functionality of a management entity 130 and an access point 110 (e.g., a management entity 130 and an access point 110 can be combined in a single device).

In one or more examples, to facilitate communications with the management entity 130, each wireless communication devices 120 may have a wireless connection (e.g., a BLUETOOTH® Low Energy (BLE) connection or other connection) to access point 110 that is communicatively connected to the management entity 130 (e.g., via the Internet, such as wirelessly, via an Ethernet connection, etc.). In some cases, messages from the management entity 130 may be wirelessly transmitted to the wireless communication devices 120 by the access point 110. Responses or information from the wireless communication devices 120 may also be received by the access point 110 and provided by the access point 110 to the management entity 130.

In some wireless systems, periodic advertisements (PAS) can be utilized to provide regular and predictable payload transmissions from a central device (e.g., which may be in the form of a network device, such as an access point 110) to one or more peripheral devices (e.g., which may each be in the form of a wireless communication device 120, such as an ESL or other peripheral device). For example, PAs can be used to issue information from a central device to multiple peripheral devices, which may be within one or more groups of peripheral devices. PAs are generally unidirectional (e.g., unidirectional transmissions) such that PAs are transmitted only one-way from a central device to one or more peripheral devices.

Periodic Advertisement with Response (PAwR) can be used for wireless systems to provide bidirectionality (e.g., bidirectional transmissions between a central device and one or more peripheral devices). Peripheral devices synchronized within a group of peripheral devices can be addressed by a central device on a synchronized channel (e.g., a radio frequency (RF) channel between the central device and the peripheral devices) whenever the central device determines to send (e.g., transmit) a request to the peripheral devices. In some cases, as used herein, a synchronized channel refers to a channel on which transmissions are synchronized (in time). For example, the channel can utilize or can be based on a frequency on which one or more communications are transmitted.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
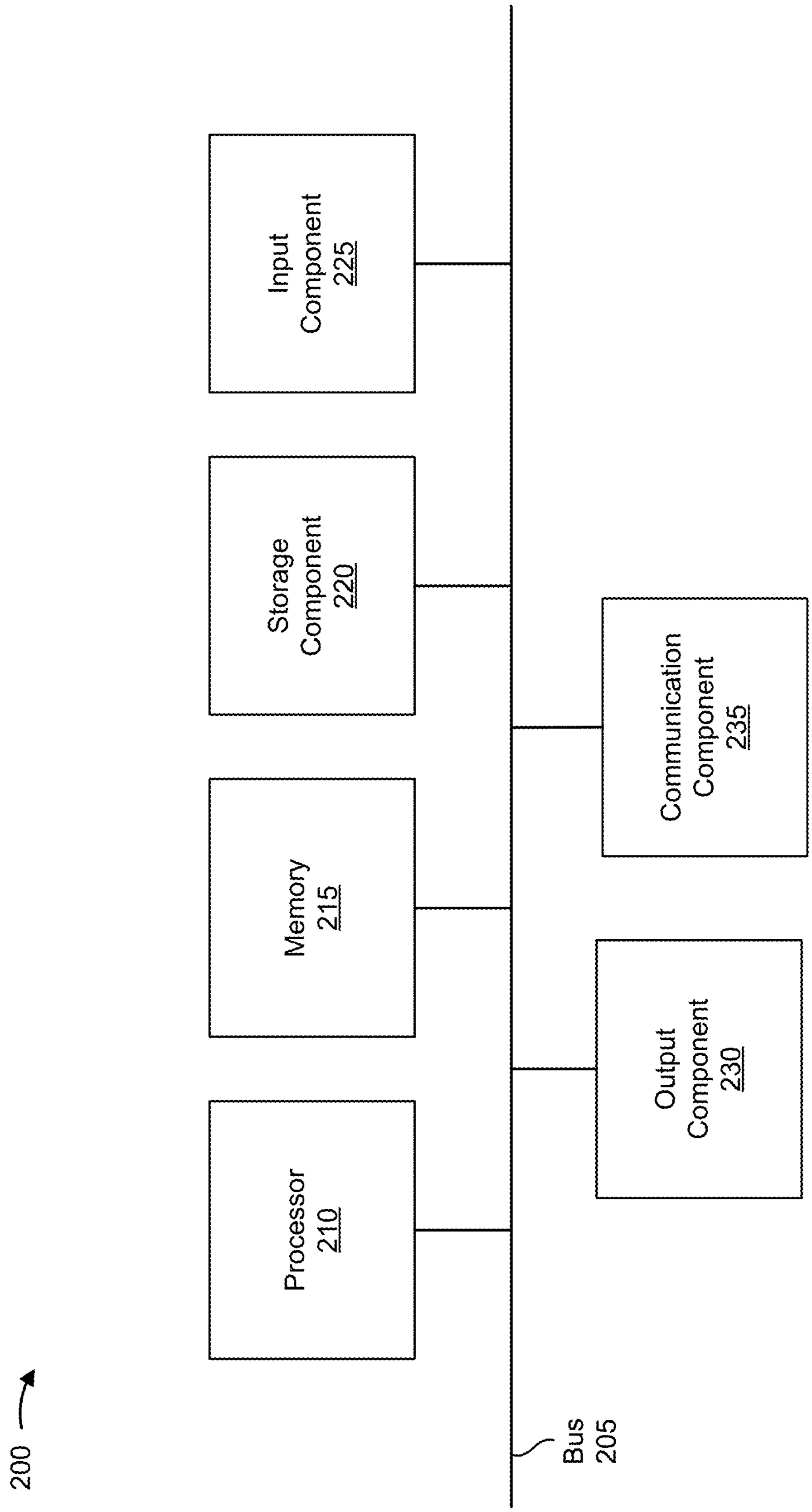
FIG. 2 is a diagram illustrating example components of a device, in accordance with the present disclosure.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, cryptography (e.g., encryption/decryption) may be implemented (e.g., by the processor 210) to encrypt and/or decrypt data (e.g., according to the Advanced Encryption Standard (AES) or Data Encryption Standard (DES) standard, or another cryptographic standard) transmitted and/or received by the one or more wireless transceivers.

In some aspects, device 200 may represent an internet of things (IOT) or electronic shelf label (ESL) device. The ESL and/or IOT device may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

As indicated above, a wireless system, such as a Bluetooth Auracast, may broadcast data to multiple devices. For example, Auracast may allow a Bluetooth system (e.g., Bluetooth based wireless network) to broadcast audio information to multiple receiving devices, such as wireless headsets. To connect with such a broadcast system, the broadcast system may regularly transmit an advertisement message (e.g., beacon). In some cases, it may be useful to only broadcast data to devices which have been previously associated with the broadcast system. To allow broadcasting to associated devices, portions of the advertisement may be encrypted using a technique known as encrypted advertisement data (EAD). EAD allows the data inside the advertisements to be encrypted and decrypted by authenticated and authorized users. Key exchange in EAD happens over a secured connection which is established between broadcaster and the peer receiving devices, or key exchange may be performed out-of-band (OOB) (e.g., via a separate network connection, during a registration process with a server, radio frequency identification (RFID) tag, etc.).

In some examples, EAD includes an encrypted data key material characteristic for the key exchange (e.g., cryptographic keys and/or information for deriving cryptographic keys) over a secure channel. For example, devices may connect securely to the advertiser to exchange keys (e.g., via an LE asynchronous connection-less (LE ACL) link). The exchanged keys may then be used for decrypting received encrypted advertisements from the advertiser.

In some cases, existing techniques may not provide a way to encrypt different sets of data using multiple different cryptographic keys so that multiple instances of encrypted data may be used. Additionally, existing techniques may not provide a way to identify which cryptographic key, of the multiple different cryptographic keys, should be used for decrypting a received advertisement. Thus, it may be useful to extend EAD to allow multiple devices to use multiple cryptographic keys for advertisements of a wireless system.

Figure 3:
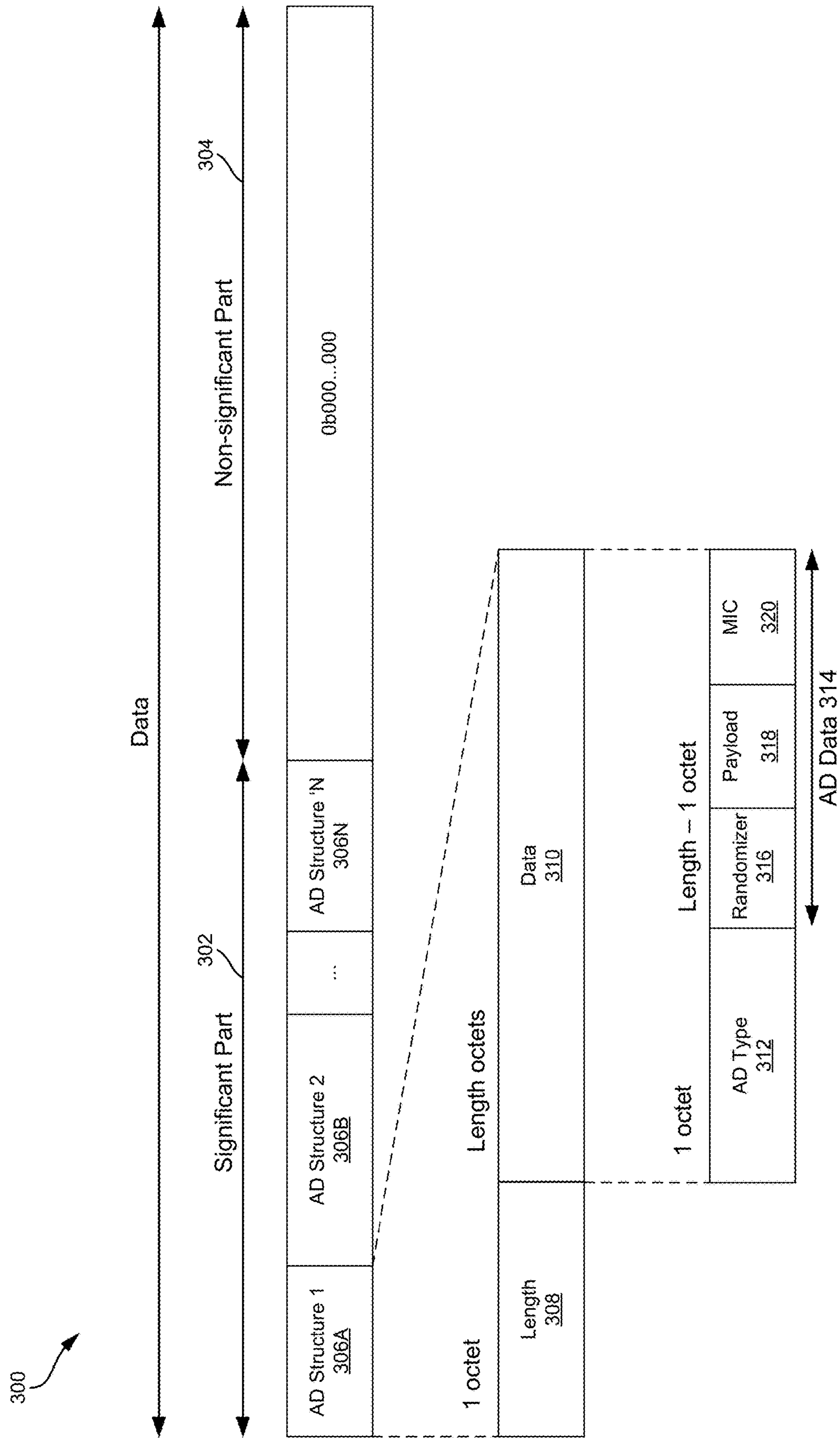
FIG. 3 illustrates a BLE advertisement payload structure, in accordance with aspects of the present disclosure.

FIG. 3 illustrates a BLE advertisement payload structure 300, in accordance with aspects of the present disclosure. In some cases, a wireless communication device (e.g., a BLE wireless communication device) may transmit a BLE beacon packet and the BLE advertisement packet may include a header and a BLE advertisement payload. The BLE advertisement payload may be organized in the BLE advertisement payload structure 300. The BLE advertisement packet header may include information about the advertisement, such as a category of the advertisement, beacon address, target device address, length, etc. In some cases, the BLE advertisement packet header may be unchanged by the inclusion of multiple cryptographic keys in the BLE advertisement payload structure 300.

The BLE advertisement payload structure 300 for BLE advertisement packet may include a significant part 302 and a non-significant part 304. In some cases, the BLE advertisement payload structure 300 may be a fixed length, such as 255 bytes (e.g., octets), and the non-significant part 302 may be all zeros and may be included as needed to pad out the significant part 302 to the fixed length. The significant part 302 may include one or more advertising data (AD) structures 306A, 306B, through 306N (collectively, AD structures 306 or AD structure 306). Each AD structure 306 includes at least a length field 308 indicating a size of the respective AD structure 306 and a data field 310. The data field 310 may include data for the advertisement. The data field 310 may include at least an advertisement (AD) type field 312 and an AD data field 314. In some cases, the AD data field 314 may have a structure (e.g., fields) defined based on the AD type indicated in the AD type field 312. In some cases, an encrypted BLE advertisement may have a predefined (e.g., in a specification) AD type set 0x31 (e.g., the AD type field may have a value of 0x31). The AD data field 314 of the encrypted BLE advertisement may include three predefined fields, a randomizer field 316 including a value for input into a cryptographic algorithm for accessing (e.g., encrypting/decrypting) a payload field 318, which includes the actual data that is to be accessed, and a message integrity check MIC) field 320 which may include a check field/bit. In some cases, the AD data field 314 of the encrypted BLE advertisement (e.g., with AD type 0x31) may include an indication that the encrypted BLE advertisement uses multiple cryptographic keys. The multiple cryptographic keys may have been previously shared, for example, over secured connection which was previously established between the broadcaster and the peer receiving devices, or key exchange may be performed out-of-band (OOB) (e.g., via a separate network connection, during a registration process with a server, radio frequency identification (RFID) tag, etc.).

Figure 4:
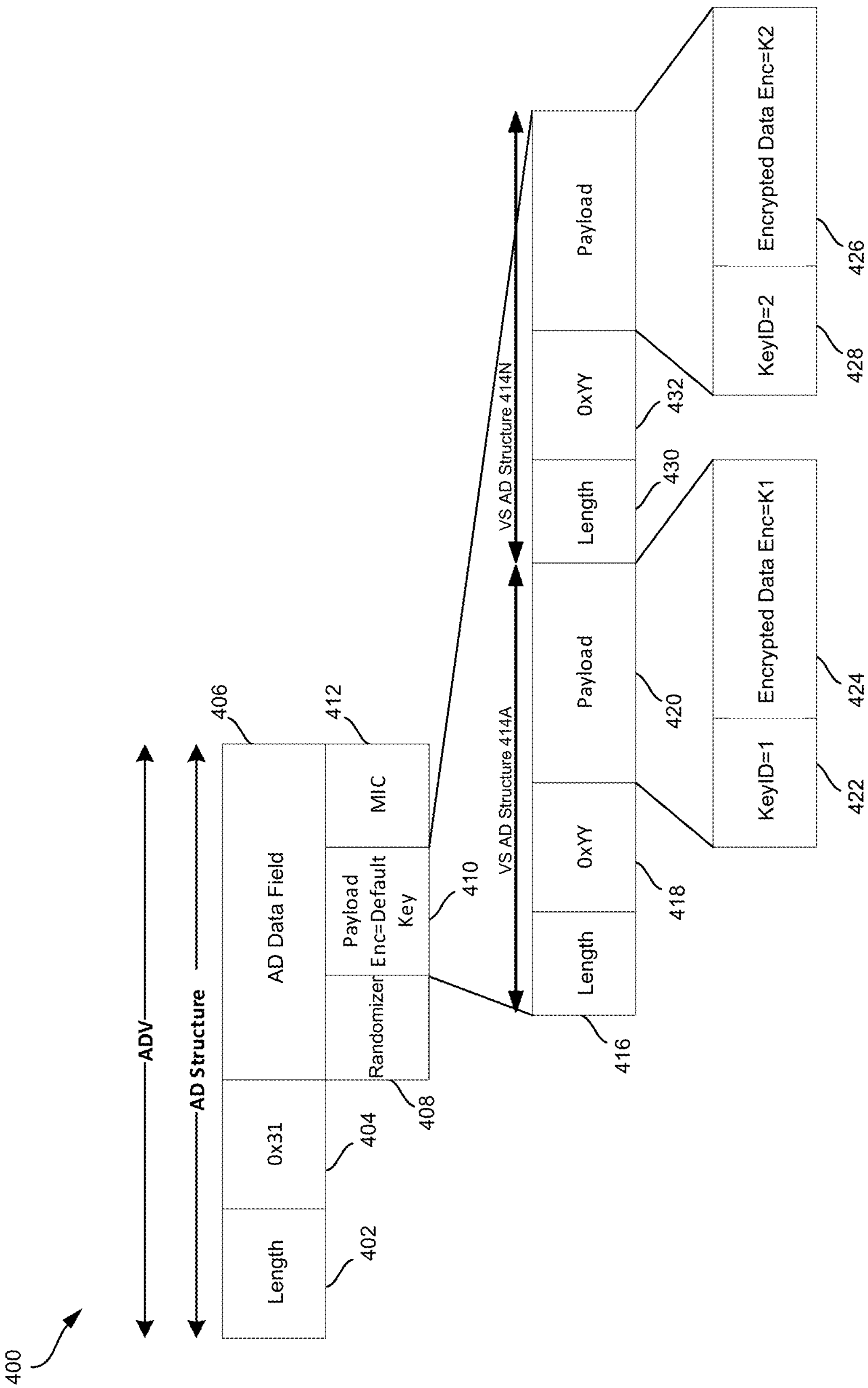
FIG. 4 illustrates an AD structure of a BLE advertisement payload structure including multiple cryptographic keys, in accordance with aspects of the present disclosure.

FIG. 4 illustrates an AD structure 400 of a BLE advertisement payload structure including multiple cryptographic keys, in accordance with aspects of the present disclosure. In some cases, AD structure 400 may correspond to one AD structure of AD structures 306 of FIG. 3. The AD structure 400 also includes a length field 402 (corresponding to length field 308 of FIG. 3), AD type field 404 (corresponding to AD type field 312 of FIG. 3), and AD data field 406 (corresponding to AD data field 314 of FIG. 3). The AD type field 404 may have a value of 0x31, indicating that the AD structure 400 is an encrypted BLE advertisement. The AD data field 406 may include a randomizer field 408 (corresponding to randomizer field 316 of FIG. 3), a payload field 410 (corresponding to payload field 318 of FIG. 3), and a MIC field 412 (corresponding to MIC field 320 of FIG. 3). In some cases, the payload field 410 may be encrypted with a default key. A value in the randomizer field 408 may be used as a nonce value to a cryptographic algorithm along with the default key to decrypt the payload field 410. Thus, where a peer device supports encrypted BLE advertisements, but not encrypted BLE advertisements with multiple encryption keys, the peer device may still be able to decode the AD data field 406 using the value in the randomizer field 408.

In some cases, the payload field 410 may include information about additional key material separate from the default key. For example, the payload field 410 may include one or more vendor specific AD structures 414A . . . 414N (collectively vendor specific AD structures 414). In some cases, vendor specific AD structures 414 may include a vendor specific length field 416 indicating a length of the vendor specific AD structure 414, a vendor specific AD type field 418 including a vendor specific data type value (e.g., 0xYY), and a vendor specific payload field 420. In some cases, the vendor specific data type may be predefined, for example, in a specification and the vendor specific data type may define a format for a vendor specific AD structure, such as vendor specific AD structure 414A. The vendor specific data type may define a format for vendor specific AD structures 414 such that the vendor specific payload field 420 includes a keyID field 422 and a data field 424. The keyID field 422 may include an identifier for key material (the key material may be any information that may be used to obtain a cryptographic key, such as an encryption/decryption key, value for an algorithm to generate a cryptographic key, identifier for a predetermined value for a cryptographic algorithm, etc.) for encrypting/decrypting the data field 424. For example, the keyID field 422 may include a value of K1 for the vendor specific AD structure 414A. The keyID field value may be different for different vendor specific AD structures 414.

In some cases, to generate the AD structure 400 for transmission, a device may perform multiple encryption steps. For example, data in the data field 424 for vendor specific data structure 414A may be encrypted based on the value (e.g., K1) in keyID field 422 and a length field 416 value may be determined for the for vendor specific data structure 414A. The length field 416 and vendor specific data type value (e.g., 0xYY) in the vendor specific AD type field 418 may be attached (e.g., prepended, concatenated with, etc.) to the keyID value in the keyID field 422 and encrypted data in the data field 424 to generate the vendor specific AD structure 414A.

In cases where multiple vendor specific data structures are used, data in data field 426 of vendor specific data structure 414N may be encrypted based on a value (e.g., K2) in keyID field 428 and a length field 430 value may be determined for the for vendor specific data structure 414N. The value may be associated with key material that may be used to generate a cryptographic key that may be used to encrypt the data in the data field. Values (e.g., keyID values) may be stored on the wireless device. For example, the keyID values and associated key materials may be provided to a wireless device, for example, over a secured channel or OOB as a part of a registration (e.g., provisioning, synchronization, pairing, etc.) process and stored. In some cases, the keyID values and associated key materials may be provided as a part of the key exchange process for EAD. The length field 430 value and vendor specific data type (e.g., 0xYY) in the vendor specific AD type field 432 may be attached (e.g., prepended, concatenated with) to the keyID in the keyID field 428 and encrypted data in the data field 426 to generate the vendor specific AD structure 414N. The vendor specific AD structure 414N may be attached (e.g., appended, concatenated with, etc.) to the other vendor specific AD structures 414 (e.g., vendor specific AD structure 414A) as an encrypted vendor specific data structure.

The encrypted vendor specific data structure (e.g., vendor specific AD structure 414A and vendor specific AD structure 414N in payload field 410 of the AD data field 406) may then be encrypted again based on the default key (e.g., based on a value in the randomizer field 408) to generate a twice encrypted vendor specific data structure as a value for the payload field 410. The value for the MIC field 412 may be determined based on values in the randomizer field 408 and payload field 410 (e.g., twice encrypted vendor specific data structure) and attached (e.g., appended, concatenated with, etc.) to the payload field 410. A value may then be determined for length field 402 for generating the AD structure 400 and attached (e.g., prepended, concatenated with, etc.) to the payload field 410 to generate a value for the AD data field 406. An AD type value (e.g., in the AD type field 404 and having a 0x31 indicating that the AD data field 406 is encrypted) may be attached (e.g., prepended, concatenated with, etc.) to the AD data field 406. A length value may be determined based for the AD data field 406 and AD data field 406 and attached (e.g., prepended, concatenated with, etc.) in a length field 402 to generate the AD structure 400. Additional AD structures 400 may be generated in substantially the same way and the AD structures may be integrated into a BLE advertisement payload and broadcast by the BLE wireless communication device.

When the BLE advertisement including the AD structure 400 is received by another device (e.g., a wireless device receiving the encrypted BLE advertisement), the AD structure 400 may be decrypted. As an example of decryption, the other device may check a value of the AD type field 404 to determine that the AD data field 406 includes encrypted data. The value in the randomizer field 408 may be used as a nonce value that may be used along with a default cryptographic key to decrypt the payload field 410 of AD data field 406 (e.g., based on the value in the randomizer field 408) to obtain the vendor specific AD structures. The other device may check the vendor specific data type value of the vendor specific AD type field 418 of the vendor specific AD structure 414A to determine that multiple keys were used (e.g., based on the value (e.g., 0xYY) of the vendor specific AD type field). The value in the keyID field 422 (e.g., K1) may then be used to obtain a cryptographic key to decrypt data field 424. For example, the value in the keyID field 422 may be used to lookup stored key material for generating the cryptographic key. In some cases, key identifier values (corresponding to values that may be in the keyID field) and associated key materials may be provided to a wireless device, for example, during registration (e.g., provisioning, synchronization, pairing, etc.) and stored. The device may look up the key materials based on the value in the keyID field 422 (e.g., by comparing the value in the keyID field 422 to stored key identifier values) to obtain the key to decrypt the data field 424. The value and associated cryptographic key may be stored in a table/list/database/etc. on the wireless device and the value and associated cryptographic key may be provided to the wireless device, for example, over a secured channel or OOB as a part of the registration (e.g., provisioning, synchronization, pairing, etc.) process.

Similarly, the value of the vendor specific AD type field 432 of the vendor specific AD structure 414N may be checked to determine that another key was used for the vendor specific AD structure 414N (e.g., based on the value (e.g., 0xYY) of the vendor specific AD type field). The value in the keyID field 428 (e.g., K2) may then be used to lookup key material for the key to decrypt data field 426. In some cases, if a value in a keyID field, such as keyID field 428, does not match any of the stored key identifiers, the device may ignore the corresponding vendor specific AD structure 414N. In some cases, if the value in the keyID field does match with a stored key identifier, but the device is not able to decrypt the data, the device can choose to ignore the advertisement/disconnect/desync from the broadcaster. This decision may be implementation specific.

In some cases, a service on a BLE wireless communication device (e.g., device that transmits BLE beacons/advertisements) or management entity (e.g., management entity 130 of FIG. 1) may be defined to support multiple key materials. In some cases, the service may be defined in a manner similar to defining other services on a BLE beacon. FIG. 5A illustrates a vendor specific Primary Service "EAD (encrypting advertising data) Key Material Service" with a vendor specific universally unique identifier (UUID) that may be defined for indicating support for multiple key materials. To allow the BLE wireless communication device or management entity to provide key materials to receiving devices, a vendor specific characteristic may be defined for sharing multiple key materials with peer devices as shown in FIG. 5B. Key materials for the multiple keys may be defined for the BLE beacon device or management entity in the format shown in FIG. 5C. Some or all of the defined key materials may also be provided to the wireless device, for example, over a secured channel (or OOB) and stored. As shown, the key material may include a key identifier (key ID) 502, a session key 504 (e.g., encryption/decryption key), and an initialization vector 506. In some cases, the key identifier 502 may be determined, for example, by the BLE wireless communication device (or management entity). For example, the key identifier may be an index value maintained by the BLE wireless communication device, vendor, third party, etc., a hash of the session key (e.g., cryptographic key) based on a hashing algorithm, an implementation specific secret number maintained by the BLE wireless communication device that becomes fixed when sent to the receiving device (e.g., over the secured channel or OOB), or other mechanism for determining the key identifier 502. In some cases, the key identifier 502 may correspond to the keyIDs and the key identifier 502 may identify the session key 504 to allow an appropriate key to be selected. In some cases, the session key 504 may be input into an algorithm along with the initialization vector 506 (which may provide a nonce value) to generate an encryption/decryption key (e.g., by a BLE wireless communication device or wireless device).

Figure 6:
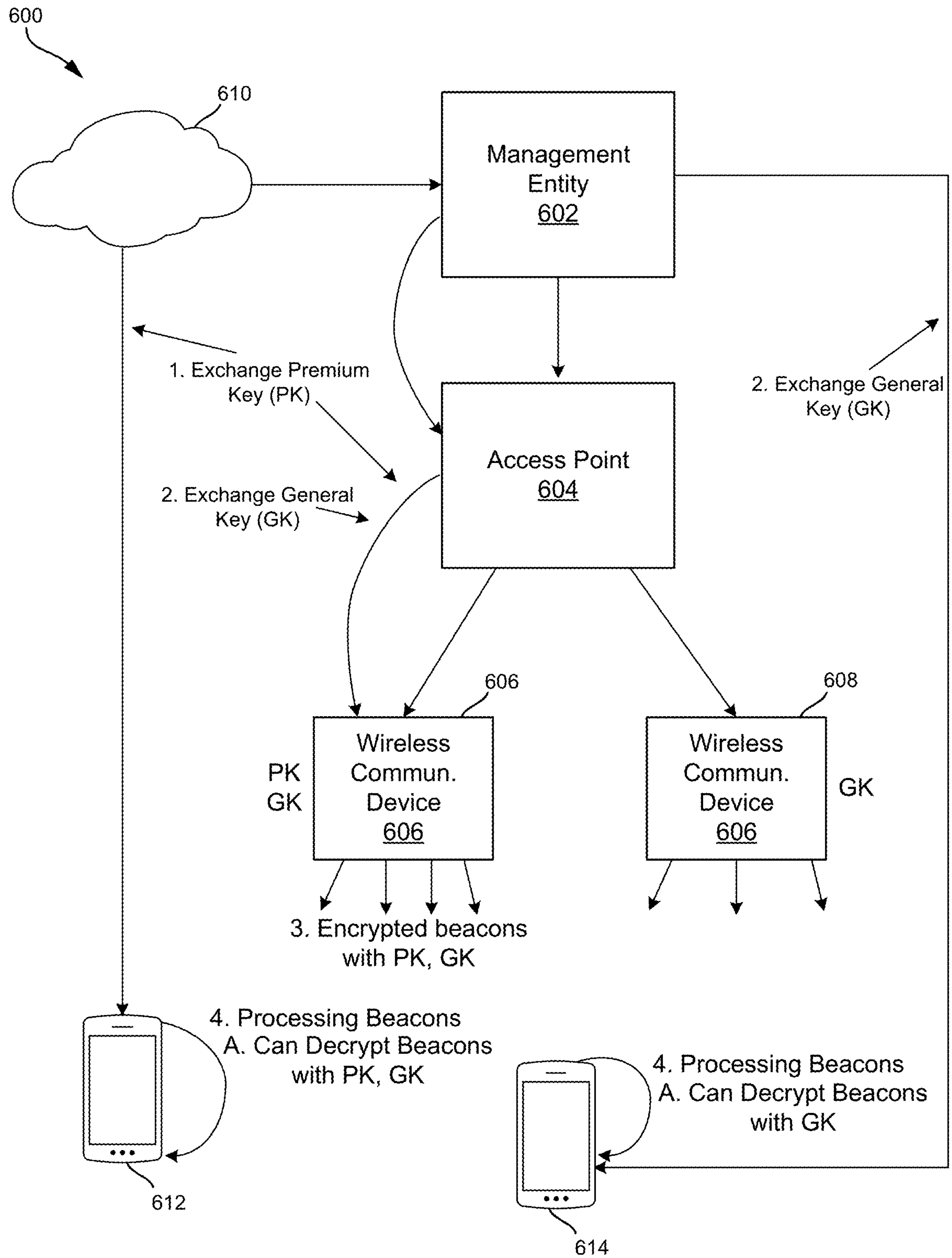
FIG. 6 illustrates a system for BLE advertisements with multiple encryption key support 600, in accordance with aspects of the present disclosure.

FIG. 6 illustrates a system for BLE advertisements with multiple encryption key support 600, in accordance with aspects of the present disclosure. In FIG. 6, a management entity 602 may be coupled to an access point 604. The management entity 602 and access point 604 may be similar to the management entity 130 and access point(s) 110 of FIG. 1. The access point 604 may be coupled to a first wireless communication device 606 (e.g., a first BLE wireless communication device) and a second wireless communication device 608 (e.g., a second BLE wireless communication device). The management entity 602 may be coupled to a cloud server 610. The cloud server 610 may provide synchronization and/or communications services as between the management entity 602 and a first wireless device 612. For example, the cloud server 610 may obtain key material, such as the example key material shown in FIG. 5C, from the management entity 602 (or access point 604) and securely provide the key material (e.g., premium key (PK) instead of or in addition to a general key (GK)) to the first wireless device 612, for example, during a registration (e.g., provisioning, synchronization, pairing, etc.) process. A second wireless device 614 may obtain key material (e.g., a GK) from the management entity and/or cloud server 610, for example, during the registration (e.g., provisioning, synchronization, pairing, etc.) process. The GK may correspond to the default key (e.g., based on randomizer field 408 of FIG. 4) and the PK may correspond to a key identified by a keyID field, such as keyID field 422 of FIG. 4.

In this example, the first wireless device 612 may be associated with a premium account and a second wireless device 614 may be associated with a general account. Devices with a general account may be provided with a GK and devices with a premium account may be provided with a PK and the GK. The access point 604 may configure the first wireless communication device 606 to broadcast BLE advertisements encrypted with multiple keys (e.g., PK and GK). The multiple keys may be used to direct different data to different users. For example, a different offers/coupons/data/etc. may be encrypted by the PK and broadcast to the premium accounts as compared to those offers/coupons/data/etc. encrypted by the GK. In some cases, as the GK may be the default key, devices associated with a premium account (e.g., the first wireless device 612) may access offers/coupons/data/etc. encrypted by both the PK and GK, while devices associated with the general account may only access offers/coupons/data/etc. encrypted by the GK.

Figure 7:
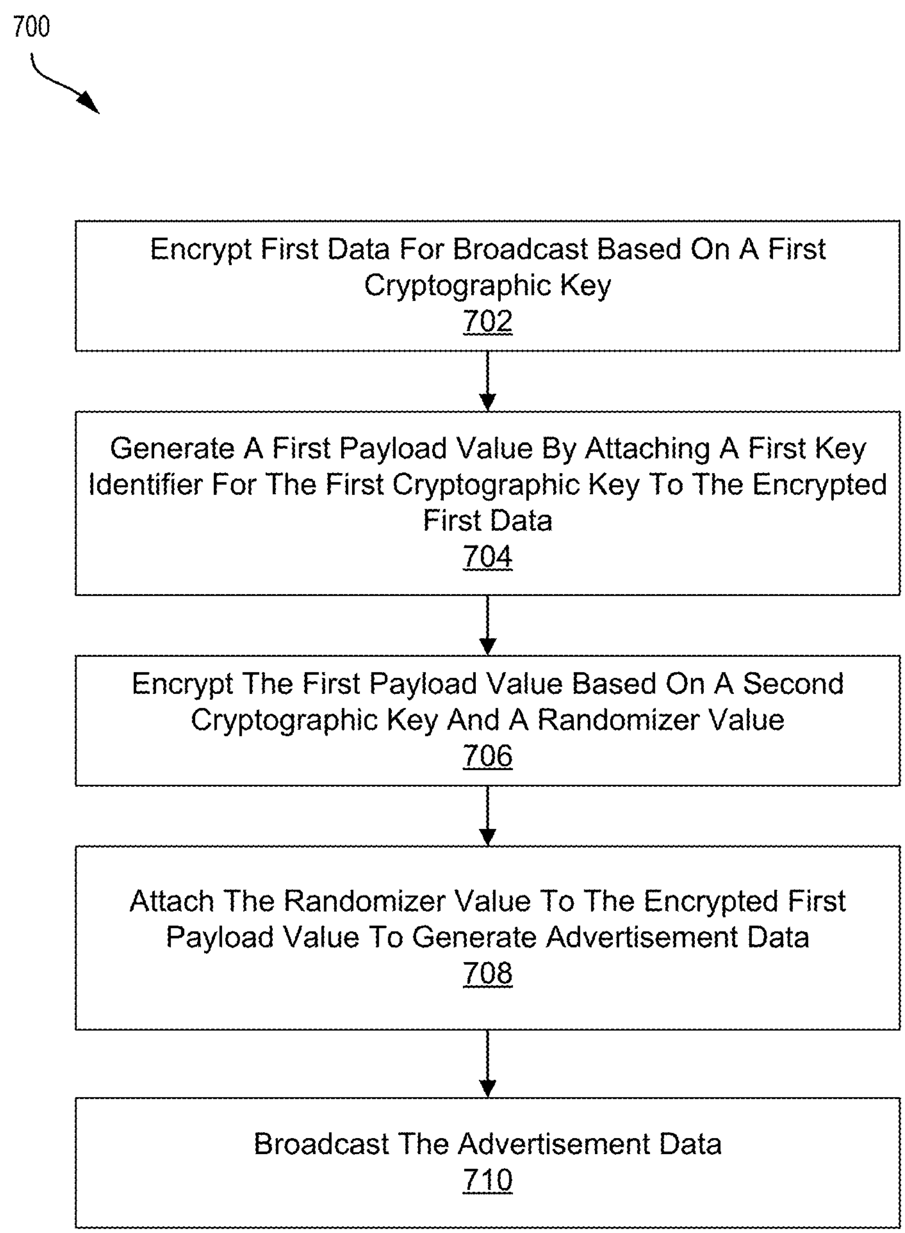
FIG. 7 is a flow diagram illustrating a process for wireless communications by a network device, in accordance with aspects of the present disclosure.

FIG. 7 is a flow diagram illustrating a process 700 for wireless communications by a network device, in accordance with aspects of the present disclosure. The process 700 may be performed by a computing device (or apparatus) or a component (e.g., a chipset, codec, etc.) of the computing device (e.g., access point 110 of FIG. 1, management entity 130 of FIG. 1, device 200 of FIG. 2, access point 604 of FIG. 6, management entity 602 of FIG. 6, wireless communication devices 606, 608 of FIG. 6, computing system 900 of FIG. 9, etc.). The computing device may be a mobile network connected device, such as a management entity, access point, network device, wireless communication device, point of sale device ESL device, or other type of computing device. The operations of the process 700 may be implemented as software components that are executed and run on one or more processors (e.g., processor 210 of FIG. 2, processor 910 of FIG. 9, etc.).

At block 702, the computing device (or component thereof) may encrypt first data for broadcast based on a first cryptographic key.

At block 704, the computing device (or component thereof) may attach a first key identifier (e.g., in keyID field 422 of FIG. 4) for the first cryptographic key to the encrypted first data to generate a first payload value (e.g., in payload field 420 of FIG. 4). In some cases, the first key identifier differs from the second key identifier and the first cryptographic key differs from the third cryptographic key. In some examples, the computing device (or component thereof) may determine the first key identifier.

At block 706, the computing device (or component thereof) may encrypt the first payload value based on a second cryptographic key (e.g., a default key) and a randomizer value (e.g., in randomizer field 408 of FIG. 4). In some cases, the computing device (or component thereof) may encrypt second data (e.g., in data field 426 of FIG. 4) for broadcast based on a third cryptographic key; attach a second key identifier (e.g., in keyID field 428 of FIG. 4) for the third cryptographic key and the vendor specific type value (e.g., 0xYY in the vendor specific AD type field 432 of FIG. 4) to the encrypted second data to generate a second payload value; attach the second payload value to the first payload value; and encrypt the first payload value and second payload value based on the second cryptographic key, wherein the randomizer value is attached to the encrypted first payload value and second payload value. In some examples, the first data is further encrypted based on the randomizer value.

At block 708, the computing device (or component thereof) may attach the randomizer value to the encrypted first payload value to generate advertisement data (e.g., in AD data field 406 of FIG. 4). In some cases, the advertisement data further includes an advertisement type value (e.g., in AD type field 404 of FIG. 4) indicating the advertisement data includes an encrypted payload. In some examples, the computing device (or component thereof) may attach a vendor specific type value to the first payload value. For example, the advertisement type value may be a vendor specific data type value such as 0xYY in a in a vendor specific AD type field 418 of FIG. 4. In some cases, the computing device (or component thereof) may determine a length of the vendor specific type value, the first key identifier, and the encrypted first data; and attach the determined length to the first payload value (e.g., in a vendor specific length field 416 of FIG. 4); and wherein encrypting the first payload value based on the second cryptographic key further comprises encrypting the first payload value, vendor specific type value, and determined length based on the second cryptographic key.

At block 710, the computing device (or component thereof) may broadcast the advertisement data. In some cases, the advertisement data may be broadcast periodically.

Figure 8:
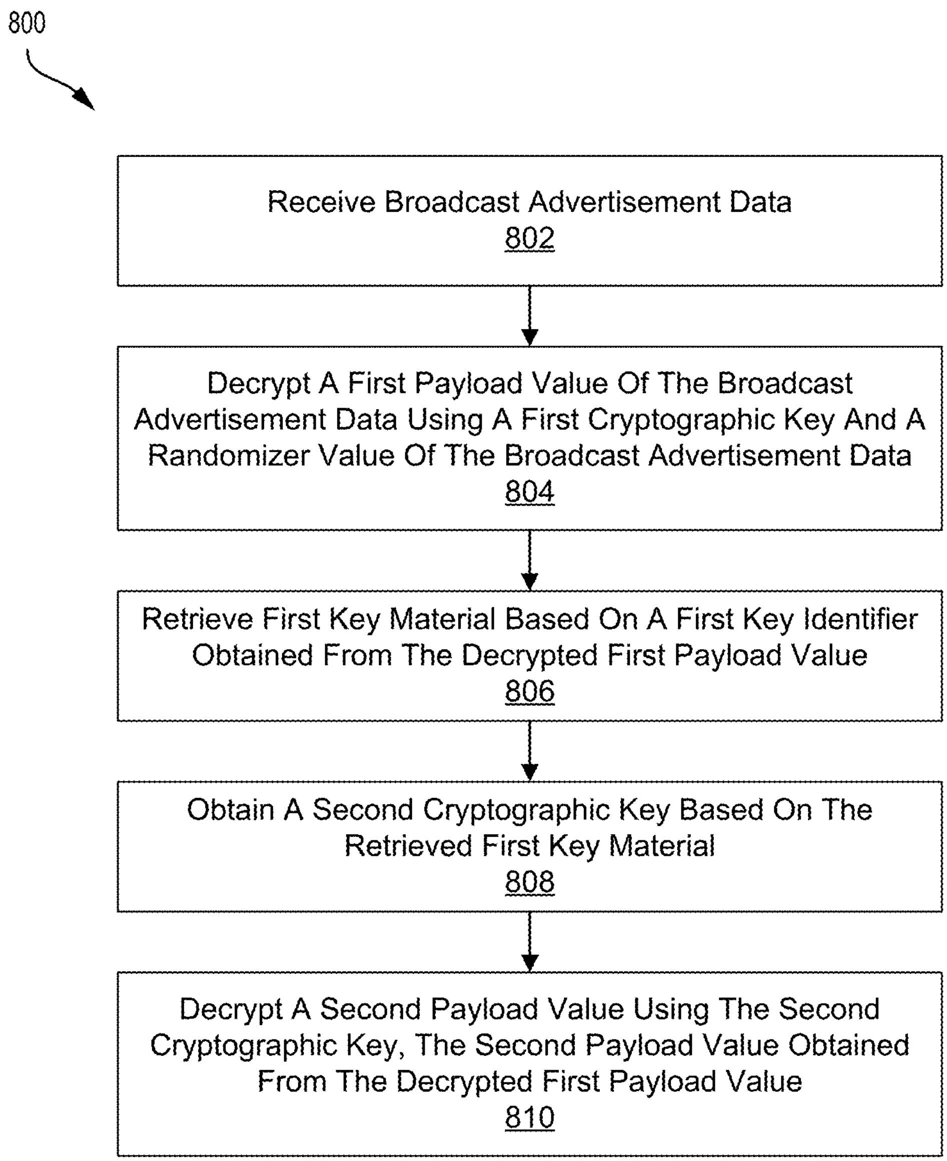
FIG. 8 is a flow diagram illustrating a process for wireless communications by a wireless device, in accordance with aspects of the present disclosure.

FIG. 8 is a flow diagram illustrating a process 800 for wireless communications by a wireless device, in accordance with aspects of the present disclosure. The process 800 may be performed by a computing device (or apparatus) or a component (e.g., a chipset, codec, etc.) of the computing device (e.g., wireless communication device 120 of FIG. 1, first wireless device 612 of FIG. 6, second wireless device 614 device 200 of FIG. 6, computing system 900 of FIG. 9, etc.). The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 800 may be implemented as software components that are executed and run on one or more processors (e.g., processor 210 of FIG. 2, processor 910 of FIG. 9, etc.).

At block 802, the computing device (or component thereof) may receive broadcast advertisement data (e.g., AD structure 400 of FIG. 4). In some cases, the advertisement data further includes an advertisement type value (e.g., (e.g., in the AD type field 404 of FIG. 4) indicating the advertisement data includes an encrypted payload (e.g., a value of 0x31 indicating that the AD data field 406 of FIG. 4 is encrypted).

At block 804, the computing device (or component thereof) may decrypt a first payload value (e.g., AD data field 406 of FIG. 4) of the broadcast advertisement data using a first cryptographic key (e.g., a default key) and a randomizer value (e.g., in randomizer field 408 of FIG. 4) of the broadcast advertisement data.

At block 806, the computing device (or component thereof) may retrieve first key material (e.g., FIG. 5C) based on a first key identifier (e.g., in keyID field 422 of FIG. 4) obtained from the decrypted first payload value. In some cases, the first key identifier differs from the second key identifier and the first cryptographic key differs from the third cryptographic key. In some examples, the first key material and second key material are stored on the apparatus. In some case, the computing device (or component thereof) may obtain the first key identifier from the decrypted first payload value based on a vendor specific type value in the decrypted first payload value (e.g., vendor specific AD type field 418 of FIG. 4).

At block 808, the computing device (or component thereof) may obtain a second cryptographic key based on the retrieved first key material. In some cases, the computing device (or component thereof) may obtain the second cryptographic key by retrieve the second cryptographic key using the first key identifier.

At block 810, the computing device (or component thereof) may decrypt a second payload value (e.g., in data field 424 of FIG. 4) using the second cryptographic key, the second payload value obtained from the decrypted first payload value. In some cases, the computing device (or component thereof) may decrypt the second payload value of the broadcast advertisement data using the first cryptographic key and the randomizer value; retrieve second key material based on a second key identifier (e.g., in keyID field 428 of FIG. 4) obtained from the decrypted second payload value; obtain a third cryptographic key based on the retrieved second key material; and decrypt a third payload value using the third cryptographic key and the randomizer value, the third payload value obtained from the decrypted first payload value.

As noted herein, the techniques or processes described herein (e.g., process 700 and/or process 800) may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 700, process 800, and/or other processes described herein may include a processor, microprocessor, micro-computer, or other component of a device that is configured to carry out the steps of the process 700, process 800, and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 700, process 800, and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 700 and the process 800 are illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 700, process 800, and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
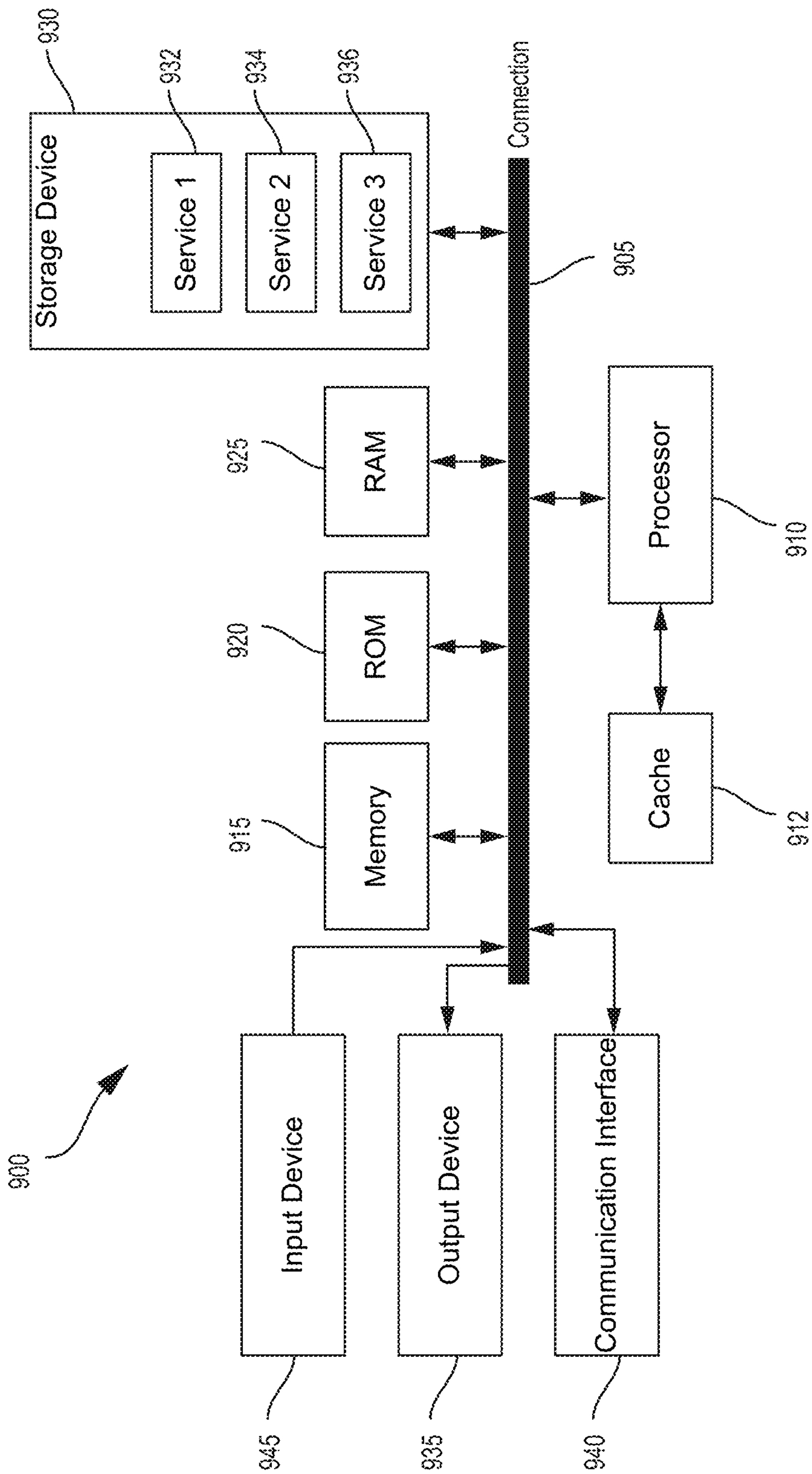
FIG. 9 is a diagram illustrating an example of a system for implementing certain aspects of the present technology.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some examples, computing system 900 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, camera, accelerometers, gyroscopes, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some examples, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM)

such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. A method for wireless communications by a network device, comprising: encrypting first data for broadcast based on a first cryptographic key; attaching a first key identifier for the first cryptographic key to the encrypted first data to generate a first payload value; encrypting the first payload value based on a second cryptographic key and a randomizer value; attaching the randomizer value to the encrypted first payload value to generate advertisement data; and broadcasting the advertisement data.

Aspect 2. The method of Aspect 1, wherein the advertisement data further includes an advertisement type value indicating the advertisement data includes an encrypted payload.

Aspect 3. The method of any of Aspects 1-2, further comprising attaching a vendor specific type value to the first payload value.

Aspect 4. The method of Aspect 3, further comprising: encrypting second data for broadcast based on a third cryptographic key; attaching a second key identifier for the third cryptographic key and the vendor specific type value to the encrypted second data to generate a second payload value; attaching the second payload value to the first payload value; and encrypting the first payload value and second payload value based on the second cryptographic key, wherein the randomizer value is attached to the encrypted first payload value and second payload value.

Aspect 5. The method of Aspect 4, wherein the first key identifier differs from the second key identifier and the first cryptographic key differs from the third cryptographic key.

Aspect 6. The method of Aspect 5, further comprising: determining a length of the vendor specific type value, the first key identifier, and the encrypted first data; and attaching the determined length to the first payload value; and wherein encrypting the first payload value based on the second cryptographic key further comprises encrypting the first payload value, vendor specific type value, and determined length based on the second cryptographic key.

Aspect 7. The method of any of Aspects 1-6, further comprising determining the first key identifier.

Aspect 8. The method of any of Aspects 1-7, wherein the first data is further encrypted based on the randomizer value.

Aspect 9. A method for wireless communications by a wireless device, comprising: receiving broadcast advertisement data; decrypting a first payload value of the broadcast advertisement data using a first cryptographic key and a randomizer value of the broadcast advertisement data; retrieving first key material based on a first key identifier obtained from the decrypted first payload value; obtaining a second cryptographic key based on the retrieved first key material; and decrypting a second payload value using the second cryptographic key, the second payload value obtained from the decrypted first payload value.

Aspect 10. The method of Aspect 9, wherein the advertisement data further includes an advertisement type value indicating the advertisement data includes an encrypted payload.

Aspect 11. The method of any of Aspects 9-10, further comprising: decrypting the second payload value of the broadcast advertisement data using the first cryptographic key and the randomizer value; retrieving second key material based on a second key identifier obtained from the decrypted second payload value; obtaining a third cryptographic key based on the retrieved second key material; and decrypting a third payload value using the third cryptographic key and the randomizer value, the third payload value obtained from the decrypted first payload value.

Aspect 12. The method of Aspect 11, wherein the first key identifier differs from the second key identifier and the first cryptographic key differs from the third cryptographic key.

Aspect 13. The method of any of Aspects 11-12, wherein the first key material and second key material are stored on the wireless device.

Aspect 14. The method of any of Aspects 9-13, further comprising obtaining the first key identifier from the decrypted first payload value based on a vendor specific type value in the decrypted first payload value.

Aspect 15. The method of Aspect 14, wherein obtaining the second cryptographic key comprises retrieving the second cryptographic key using the first key identifier.

Aspect 16. An apparatus for wireless communications, the apparatus comprising: at least one memory; and at least one processor coupled to the at least one memory, the at least one processor being configured to: encrypt first data for broadcast based on a first cryptographic key; attach a first key identifier for the first cryptographic key to the encrypted first data to generate a first payload value; encrypt the first payload value based on a second cryptographic key and a randomizer value; attach the randomizer value to the encrypted first payload value to generate advertisement data; and broadcast the advertisement data.

Aspect 17. The apparatus of Aspect 16, wherein the advertisement data further includes an advertisement type value indicating the advertisement data includes an encrypted payload.

Aspect 18. The apparatus of any of Aspects 16-17, wherein the at least one processor is further configured to attach a vendor specific type value to the first payload value.

Aspect 19. The apparatus of Aspect 18, wherein the at least one processor is further configured to: encrypt second data for broadcast based on a third cryptographic key; attach a second key identifier for the third cryptographic key and the vendor specific type value to the encrypted second data to generate a second payload value; attach the second payload value to the first payload value; and encrypt the first payload value and second payload value based on the second cryptographic key, wherein the randomizer value is attached to the encrypted first payload value and second payload value.

Aspect 20. The apparatus of Aspect 19, wherein the first key identifier differs from the second key identifier and the first cryptographic key differs from the third cryptographic key.

Aspect 21. The apparatus of Aspect 20, wherein the at least one processor is further configured to: determine a length of the vendor specific type value, the first key identifier, and the encrypted first data; and attach the determined length to the first payload value; and wherein encrypting the first payload value based on the second cryptographic key further comprises encrypting the first payload value, vendor specific type value, and determined length based on the second cryptographic key.

Aspect 22. The apparatus of any of Aspects 16-21, wherein the at least one processor is further configured to determine the first key identifier.

Aspect 23. The apparatus of any of Aspects 16-22, wherein the first data is further encrypted based on the randomizer value.

Aspect 24. An apparatus for wireless communications, comprising: at least one memory; and at least one processor coupled to the at least one memory, the at least one processor being configured to: receive broadcast advertisement data; decrypt a first payload value of the broadcast advertisement data using a first cryptographic key and a randomizer value of the broadcast advertisement data; retrieve first key material based on a first key identifier obtained from the decrypted first payload value; obtain a second cryptographic key based on the retrieved first key material; and decrypt a second payload value using the second cryptographic key, the second payload value obtained from the decrypted first payload value.

Aspect 25. The apparatus of Aspect 24, wherein the advertisement data further includes an advertisement type value indicating the advertisement data includes an encrypted payload.

Aspect 26. The apparatus of any of Aspects 24-25, wherein the at least one processor is further configured to: decrypt the second payload value of the broadcast advertisement data using the first cryptographic key and the randomizer value; retrieve second key material based on a second key identifier obtained from the decrypted second payload value; obtain a third cryptographic key based on the retrieved second key material; and decrypt a third payload value using the third cryptographic key and the randomizer value, the third payload value obtained from the decrypted first payload value.

Aspect 27. The apparatus of Aspect 26, wherein the first key identifier differs from the second key identifier and the first cryptographic key differs from the third cryptographic key.

Aspect 28. The apparatus of any of Aspects 26-27 wherein the first key material and second key material are stored on the apparatus.

Aspect 29. The apparatus of any of Aspects 24-28, wherein the at least one processor is further configured to obtain the first key identifier from the decrypted first payload value based on a vendor specific type value in the decrypted first payload value.

Aspect 30. The apparatus of Aspect 29, wherein, to obtain the second cryptographic key, the at least one processor is further configured to retrieve the second cryptographic key using the first key identifier.

Aspect 31: A non-transitory computer-readable medium having stored thereon instructions that, when executed by at least one processor, cause the at least one processor to perform one or more of operations according to any of Aspects 1 to 15.

Aspect 31: An apparatus for wireless communications, comprising means for performing one or more of operations according to any of Aspects 1 to 15.

What is claimed is:

1. A method for wireless communications by a network device, comprising:
- encrypting first data for broadcast based on a first cryptographic key;
- attaching a first key identifier for the first cryptographic key to the encrypted first data to generate a first payload value;
- attaching a vendor specific type value to the first payload value;
- encrypting second data for broadcast based on a third cryptographic key;
- attaching a second key identifier for the third cryptographic key and the vendor specific type value to the encrypted second data to generate a second payload value;
- attaching the second payload value to the first payload value;
- encrypting the first payload value and second payload value based on a second cryptographic key and a randomizer value;
- attaching the randomizer value to the encrypted first payload value and second payload value to generate advertisement data; and
- broadcasting the advertisement data.

2. The method of claim 1, wherein the advertisement data further includes an advertisement type value indicating the advertisement data includes an encrypted payload.

3. The method of claim 1, wherein the first key identifier differs from the second key identifier and the first cryptographic key differs from the third cryptographic key.

4. The method of claim 3, further comprising:
- determining a length of the vendor specific type value, the first key identifier, and the encrypted first data; and
- attaching the determined length to the first payload value; and wherein encrypting the first payload value based on the second cryptographic key further comprises encrypting the first payload value, vendor specific type value, and determined length based on the second cryptographic key.

5. The method of claim 1, further comprising determining the first key identifier.

6. The method of claim 1, wherein the first data is further encrypted based on the randomizer value.

7. A method for wireless communications by a wireless device, comprising:
- receiving broadcast advertisement data;
- decrypting a first payload value of the broadcast advertisement data using a first cryptographic key and a randomizer value of the broadcast advertisement data;
- retrieving first key material based on a first key identifier obtained from the decrypted first payload value;

obtaining a second cryptographic key based on the retrieved first key material;

decrypting a second payload value using the second cryptographic key, the second payload value obtained from the decrypted first payload value;

decrypting the second payload value of the broadcast advertisement data using the first cryptographic key and the randomizer value;

retrieving second key material based on a second key identifier obtained from the decrypted second payload value;

obtaining a third cryptographic key based on the retrieved second key material; and decrypting a third payload value using the third cryptographic key and the randomizer value, the third payload value obtained from the decrypted first payload value.

8. The method of claim 7, wherein the advertisement data further includes an advertisement type value indicating the advertisement data includes an encrypted payload.

9. The method of claim 7, wherein the first key identifier differs from the second key identifier and the first cryptographic key differs from the third cryptographic key.

10. The method of claim 7, wherein the first key material and second key material are stored on the wireless device.

11. The method of claim 7, further comprising obtaining the first key identifier from the decrypted first payload value based on a vendor specific type value in the decrypted first payload value.

12. The method of claim 11, wherein obtaining the second cryptographic key comprises retrieving the second cryptographic key using the first key identifier.

13. An apparatus for wireless communications, the apparatus comprising:

at least one memory; and at least one processor coupled to the at least one memory, the at least one processor being configured to:

encrypt first data for broadcast based on a first cryptographic key;

attach a first key identifier for the first cryptographic key to the encrypted first data to generate a first payload value;

attach a vendor specific type value to the first payload value;

encrypt second data for broadcast based on a third cryptographic key;

attach a second key identifier for the third cryptographic key and the vendor specific type value to the encrypted second data to generate a second payload value;

attach the second payload value to the first payload value;

encrypt the first payload value and second payload value based on a second cryptographic key and a randomizer value;

attach the randomizer value to the encrypted first payload value and second payload value to generate advertisement data; and broadcast the advertisement data.

14. The apparatus of claim 13, wherein the advertisement data further includes an advertisement type value indicating the advertisement data includes an encrypted payload.

15. The apparatus of claim 13, wherein the first key identifier differs from the second key identifier and the first cryptographic key differs from the third cryptographic key.

16. The apparatus of claim 15, wherein the at least one processor is further configured to:

determine a length of the vendor specific type value, the first key identifier, and the encrypted first data; and attach the determined length to the first payload value; and wherein encrypting the first payload value based on the second cryptographic key further comprises encrypting the first payload value, vendor specific type value, and determined length based on the second cryptographic key.

17. The apparatus of claim 13, wherein the at least one processor is further configured to determine the first key identifier.

18. The apparatus of claim 13, wherein the first data is further encrypted based on the randomizer value.

19. An apparatus for wireless communications, comprising:

at least one memory; and at least one processor coupled to the at least one memory, the at least one processor being configured to:

receive broadcast advertisement data;

decrypt a first payload value of the broadcast advertisement data using a first cryptographic key and a randomizer value of the broadcast advertisement data;

retrieve first key material based on a first key identifier obtained from the decrypted first payload value;

obtain a second cryptographic key based on the retrieved first key material;

decrypt a second payload value using the second cryptographic key, the second payload value obtained from the decrypted first payload value;

decrypt the second payload value of the broadcast advertisement data using the first cryptographic key and the randomizer value;

retrieve second key material based on a second key identifier obtained from the decrypted second payload value;

obtain a third cryptographic key based on the retrieved second key material; and decrypt a third payload value using the third cryptographic key and the randomizer value, the third payload value obtained from the decrypted first payload value.

20. The apparatus of claim 19, wherein the advertisement data further includes an advertisement type value indicating the advertisement data includes an encrypted payload.

21. The apparatus of claim 19, wherein the first key identifier differs from the second key identifier and the first cryptographic key differs from the third cryptographic key.

22. The apparatus of claim 19, wherein the first key material and second key material are stored on the apparatus.

23. The apparatus of claim 19, wherein the at least one processor is further configured to obtain the first key identifier from the decrypted first payload value based on a vendor specific type value in the decrypted first payload value.

24. The apparatus of claim 23, wherein, to obtain the second cryptographic key, the at least one processor is further configured to retrieve the second cryptographic key using the first key identifier.

* * * * *